United States Patent
Mahkovec et al.

(10) Patent No.: US 10,489,369 B2
(45) Date of Patent: *Nov. 26, 2019

(54) PROVIDING A CONTENT PREVIEW

(71) Applicant: Dropbox, Inc., San Francisco, CA (US)

(72) Inventors: Ziga Mahkovec, San Francisco, CA (US); Nikrad Mahdi, San Francisco, CA (US); Christopher Beckmann, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 274 days.

This patent is subject to a terminal disclaimer.

(21) Appl. No.: 15/661,648

(22) Filed: Jul. 27, 2017

(65) Prior Publication Data

US 2017/0322937 A1     Nov. 9, 2017

Related U.S. Application Data

(63) Continuation of application No. 15/341,482, filed on Nov. 2, 2016, now Pat. No. 9,747,321, which is a
(Continued)

(51) Int. Cl.
*G06F 16/00*     (2019.01)
*G06F 16/22*     (2019.01)
(Continued)

(52) U.S. Cl.
CPC ........ *G06F 16/2255* (2019.01); *G06F 16/113* (2019.01); *G06F 16/128* (2019.01);
(Continued)

(58) Field of Classification Search
None
See application file for complete search history.

(56) References Cited

U.S. PATENT DOCUMENTS 6,385,596 B1 * 5/2002 Wiser ............... G06F 21/10
                                                    369/84
7,797,323 B1   9/2010 Eshghi et al.
(Continued)

FOREIGN PATENT DOCUMENTS

| JP | 2007128192 A | 5/2007 |
| JP | 2008538627 A | 10/2008 |
| JP | 2009059275 A | 3/2009 |

OTHER PUBLICATIONS

International Search Report and Written Opinion dated May 2, 2014, issued in corresponding International Application No. PCT/US2014/013890.
(Continued)

*Primary Examiner* — Son T Hoang
(74) *Attorney, Agent, or Firm* — Polsinelli PC (57) ABSTRACT

A content preview of a content item stored in an online storage system can be viewed on a client device without the content item itself being downloaded to the client device and without the use of software associated with the content item being installed on the client device. Furthermore, data storage and processing requirements can be minimized by creating and storing only one content preview for each unique content item. The content item can be identified by using the content item as a hash key in a hashing algorithm. The resulting unique identifier can be used to search a preview index that lists all created content previews and their location. A content preview is only created if one does not exist. The unique identifier can be used to locate the content preview and return it in response to a preview request by a client device.

20 Claims, 6 Drawing Sheets

Related U.S. Application Data continuation of application No. 14/797,997, filed on Jul. 13, 2015, now Pat. No. 9,501,511, which is a continuation of application No. 13/826,436, filed on Mar. 14, 2013, now Pat. No. 9,110,937.

(60) Provisional application No. 61/758,580, filed on Jan. 30, 2013.

(51) Int. Cl.
  *G06F 16/13* (2019.01)
  *G06F 16/11* (2019.01)
  *G06F 16/16* (2019.01)
  *G06F 16/951* (2019.01)

(52) U.S. Cl.
  CPC ............ G06F 16/13 (2019.01); G06F 16/168 (2019.01); G06F 16/951 (2019.01)

(56) References Cited

U.S. PATENT DOCUMENTS

| | | | |
|---|---|---|---|
| 2005/0004995 A1* | 1/2005 | Stochosky | H04L 12/1813 709/219 |
| 2006/0059173 A1 | 3/2006 | Hirsch et al. | |
| 2006/0242163 A1 | 10/2006 | Miller et al. | |
| 2008/0065821 A1* | 3/2008 | Robotham | G11C 15/00 711/108 |
| 2009/0157987 A1* | 6/2009 | Barley | G06Q 20/409 711/154 |
| 2010/0293142 A1* | 11/2010 | Ackerman | H04L 9/3236 707/640 |
| 2013/0238969 A1* | 9/2013 | Smith | G06F 17/212 715/230 |

OTHER PUBLICATIONS

Toshiyuki Sakurai et al., "Sequence Preserving Digest: A New Method for Efficiently Detecting Partially Duplicated Web Pages," The First Forum on Data Engineering and Information Management [online], Japan, The Institute of Electronics, Information and Communication Engineers, Technical Committee on Data Engineering, May 9, 2005.

* cited by examiner

PROVIDING A CONTENT PREVIEW

CROSS REFERENCE TO RELATED APPLICATIONS

This application is a continuation of U.S. patent application Ser. No. 15/341,482, filed Nov. 2, 2016, which a continuation of U.S. patent application Ser. No. 14/797,997, now U.S. Pat. No. 9,501,511, filed Jul. 13, 2015, which a continuation of U.S. patent application Ser. No. 13/826,436, now U.S. Pat. No. 9,110,937, filed Mar. 14, 2013, which claims the benefit of and priority to U.S. Provisional Patent Application No. 61/758,580, filed on Jan. 30, 2013; the contents of each of the above patent applications are hereby expressly incorporated by reference in their entirety for all purposes herein.

TECHNICAL FIELD

The present technology pertains to content previews, and more specifically pertains to storing only one content preview for a content item.

BACKGROUND

Cloud data storage allows users to store their data online and access it from any computing device with network connectivity. Users can therefore access a variety of files such as text documents, spreadsheets, photos and media files from a variety of computing devices such as a personal computer (PC), laptop, smartphone, tablet PC, etc. Current cloud storage systems require that files stored in the cloud be downloaded to a computing device and opened with software running on the computing devices.

One problem with the current model is that mobile computing devices, such as smartphones and tablet PC's, may have limited storage space and thus downloading files stored in the cloud can be resource intensive. Further, to open different types of files, the current system requires that software capable of opening the different files be running on the different computing devices. Accordingly, an improved system of viewing content stored in the cloud is needed.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for providing a content preview of a content item stored in a synchronized online content management system. The content preview can be viewed on a client device without the content item itself being downloaded to the client device and without the use of software associated with the content item being installed on the client device. Furthermore, data storage and processing requirements can be minimized by creating and storing only one content preview for each unique content item. Accordingly, if the same content item is included in the content libraries of multiple users, a single content preview can be created that can be accessed by the different users.

To accomplish this, a content item can be identified to determine whether a content preview of the content item already exists. A content preview can be created only if a content preview of the content item does not already exist. To identify a content item, a hashing algorithm can be used. For example, the content item can be used as an input in the hashing algorithm, such that a unique hash identifier is produced. The resulting hash identifier can thus identify that two content items are the same even if they are labeled differently.

In some embodiments, the content item can be split into fixed size blocks that can each be used as a hash key in the hashing algorithm. The resulting hash identifiers can then be used to create a block list used to identify the content item. For example, in some embodiments, the resulting hash identifiers can be concatenated to create the block list.

Once the content item is identified, a determination as to whether a content preview of the content item exists can be made. In some embodiments, the unique identifier of the content item, such as the block list, can be used to search a preview index that identifies each content item for which a content preview has been created. The preview index can include a preview entry, including the unique identifier and the location of the content preview in memory, for each created content preview. If there is no preview entry associated with the content item, then a content preview of the content item does not exist and one will be created. If a preview entry associated with the content item does exist, a content preview already exists and one will not be created.

The unique identifier can also be associated with a content entry corresponding to the content item. The content entry can include metadata identifying the content item, such as a user account associated with the content item, the location of the content item in memory, a data path and name of the content item, etc.

A client device can transmit a preview request requesting that the content preview of the content item be displayed on the client device. The preview request can include metadata identifying the unique identifier, such as the block list, stored in the preview index that can be used to locate the content preview. Alternatively, the preview request can include metadata identifying the content entry corresponding to the content item. The unique identifier can thus be retrieved from the content entry and then used to search the preview index to locate the requested content preview.

BRIEF DESCRIPTION OF THE DRAWINGS

The above-recited and other advantages and features of the disclosure will become apparent by reference to specific embodiments thereof which are shown in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for providing a content preview of content items stored in an online storage system that does not require the content item itself be downloaded to a client device or that software capable of opening the content item be installed on the client device. Further the disclosed technology minimizes data storage requirements by creating only one content preview for each content item. Accordingly, if the same content item is included in the content libraries of multiple users, the one content preview for the content item can be used.

To accomplish this, a content item can be uniquely identified and a content preview created only if one does not already exist. The content item can be identified using a hashing algorithm. For example, the content item can be used as a hash key in the hashing algorithm that produces a unique hash identifier for each unique hash key. The resulting hash identifier can thus identify a content item even if the content item is associated with a different file name. In some embodiments, the content item can be split into fixed size blocks that can each be used as a hash key in the hashing algorithm. The resulting hash keys can be used to create a block list used to identify the content item.

Once the content item is identified, a determination as to whether a content preview of the content item exists can be made by searching a preview index that identifies each content item for which a content preview has been created. The unique identifier of the content item, such as the block list, can be used to identify each content item in the preview index. If there is no preview entry associated with the content item, then a content preview does not exist and one will be created. If a preview entry associated with the content item does exist, a content preview already exists and a new content preview will not be created.

The preview index can also include the location of each created content preview in memory. The unique identifier of a content item can thus be used to search the preview index to determine the location of the content preview of the content item.

Figure 1:
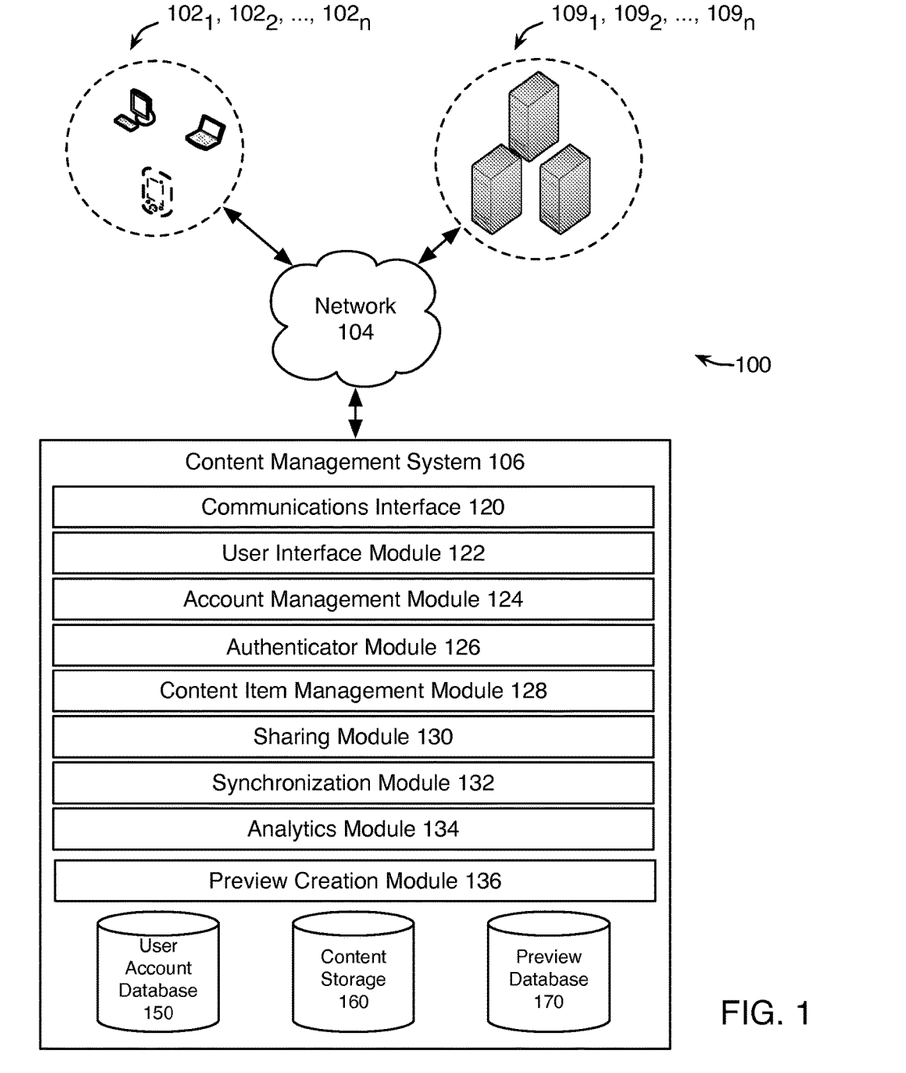
FIG. 1 shows an exemplary configuration of devices and a network in accordance with the invention.

An exemplary system configuration 100 is shown in FIG. 1, wherein electronic devices communicate via a network for purposes of exchanging content and other data. The system can be configured for use on a wide area network such as that shown in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of content management system 106 is simply one possible configuration and that other configurations with more or less components are also possible. For example, in some embodiments, content management system 106 can include preview creation module 136 configured to create a content preview of a content item stored in content management system 106.

A content preview can be a content item converted into a read only version that can be presented on client device 102 without requiring client device 102 to download the content item or use software associated with the content item. For example, a content preview can be a read only version of the content item in Portable Document Format (PDF). Thus, a content item such as a spreadsheet can be converted into a PDF and displayed on requesting client device 102 without the spreadsheet content item being downloaded by client device 102 and without spreadsheet software installed on client device 102. Likewise a word processor document can be converted into a read only PDF and viewed on requesting client device 102 without use of word processor software on client device 102. A content item can thus be quickly and easily viewed on client device 102 without requiring that the content item be downloaded or that the corresponding software be installed on client device 102.

To provide a content preview, preview creation module 136 can be configured to monitor content management system 106 to identify a content item preview trigger that occurs on content management system 106. A content item preview trigger can be either the addition of a content item to content management system 106 or the modification of a content item already stored on content management system 106. Upon detection of a content item preview trigger, preview creation module 136 can be configured to create a content preview of the content item associated with the content item preview trigger (i.e. the added or modified content item). The content preview can be created using any available conversion software known in the art.

In some embodiments, the content management system 106 can be configured to store a single content preview for each unique content item stored in content management system 106. The single content preview can be used to provide a preview of the content item to multiple users that have the same content item stored in their content library on content management system 106. Thus, duplicate content previews are not necessary. This can reduce storage requirements because only one content preview is stored per unique content item rather than one content preview for each copy of unique content item stored in content management system 106. Further, this can reduce system resource usage because a content preview only needs to be created once rather than once for each copy of the unique content item.

To accomplish this, preview creation module 136 can be configured to identify each unique content item associated with a content item preview trigger and determine whether a content preview of the content item has already been created. In some embodiments, preview creation module 136 can use a hashing algorithm to identify each unique content item. The hashing algorithm can be any of a variety of known hashing algorithms. For example, in some embodiments the hashing algorithm can be the SHA256 function.

In some embodiments, the hashing algorithm can result in a unique hash identifier for each unique key entered into the hashing algorithm. Further, in some embodiments, the hashing algorithm can be referentially transparent such that if the hashing algorithm is called twice on "equal" hash keys, the same unique hash identifier will be returned for each. Thus, for example, two hash keys that consist of the same sequence of characters will provide the same resulting unique hash identifier when used in the hashing algorithm.

A hash identifier can be any of a variety of identifiers known in the art. For example a hash identifier can be a string, integer, etc.

To uniquely identify a content item, preview creation module 136 can be configured to use the content item as the hash key in the hashing algorithm. The resulting unique hash identifier can be used to identify the content item. In some embodiments, the entire content item can be used as the hash key. In some embodiments, only a portion of the content item can be used as the hash key. For example, a portion from the beginning of the content item, end of the content item or both the beginning and end can be used as the hash key.

In some embodiments, the content item can be split into fixed size blocks and each fixed size block can be used as a key in the hashing algorithm. For example, preview creation module 136 can be configured to split the content item into fixed size blocks and use the resulting fixed size blocks as hash keys. The fixed size blocks can be, for example 2 MB, 4 MB, etc., according to the preferences of the implementer. The fixed size blocks do not necessarily need to all be the same size but rather limited to a max size. For example, a 10 MB content item can be split into three fixed size blocks such that two of the fixed size blocks are 4 MB and one is 2 MB. In some embodiments, preview creation module 136 can split the content items consistently such that when two equal content items are split they will result in equal fixed size blocks. Further, splitting the content item into fixed size blocks can be advantageous in embodiments where content management system 106 also stores content items in similar fixed size blocks.

Preview creation module 136 can be configured to use each fixed size block resulting from splitting the content item as a hash key in the hashing algorithm. In some embodiments, preview creation module 136 can create a block list that identifies the content item from the resulting hash identifiers. For example, in some embodiments, preview creation module 136 can create the block list by concatenating the hash identifiers resulting from using each of the fixed size blocks as a separate hash key. The resulting block list can be used to identify the content item. In some embodiments, preview creation module 136 can be configured to use a consistent method to create the block list such that a block list created with hash identifiers resulting from two equal content items split into fixed size blocks will result in equal block lists.

Once preview creation module 136 has identified the content item, for example by using a hashing algorithm, preview creation module 136 can determine whether a content preview for the content item already exists. To accomplish this, in some embodiments, preview creation module 136 can be configured to check a content preview index listing each content preview that has already been created. For example, in some embodiments, the content preview index can include a preview entry for each content preview already created. Each preview entry can include the block list, or other unique identifier, of each content item for which a content preview has already been created. Further, in some embodiments, each preview entry in the preview index can also include the location of the content preview in memory.

Preview creation module 136 can thus search the preview index for the unique identifier associated with the content item, such as the block list, to determine whether a content preview associated with the content item already exists. In some embodiments, content management system 106 can include preview database 170 configured to store the preview index and preview creation module 136 can be configured to communicate with preview database 170 to search the preview index.

If preview creation module 136 determines that a preview of the content item does not exist, i.e. a preview entry associated with the content item is not found in the preview index, preview creation module 136 can create a content preview of the content item and store the content preview in memory. For example, in some embodiments, the content preview can be stored in preview database 170. Alternatively, in some embodiments, the content preview can be stored in content storage 160. In some embodiments, preview database 170 and content storage 160 can be part of the same database.

Further, preview creation module 136 can also create a new preview entry in the preview index indicating that the content preview was created and stored in memory. The new preview entry can include a unique identifier identifying the content item, such as the block list, as well as the physical location of the content preview in memory. For example, in some embodiments, the preview entry can include a pointer to the content preview.

If preview creation module 136 determines that a preview of the content item does exist, a new content preview of the content item does not need to be created. Rather, the previously created content preview can be used to provide a preview of the content item.

Preview creation module 136 can further be configured to store the unique identifier, such as the block list, associated with a content item in the content entry associated with the content item.

Figure 2:
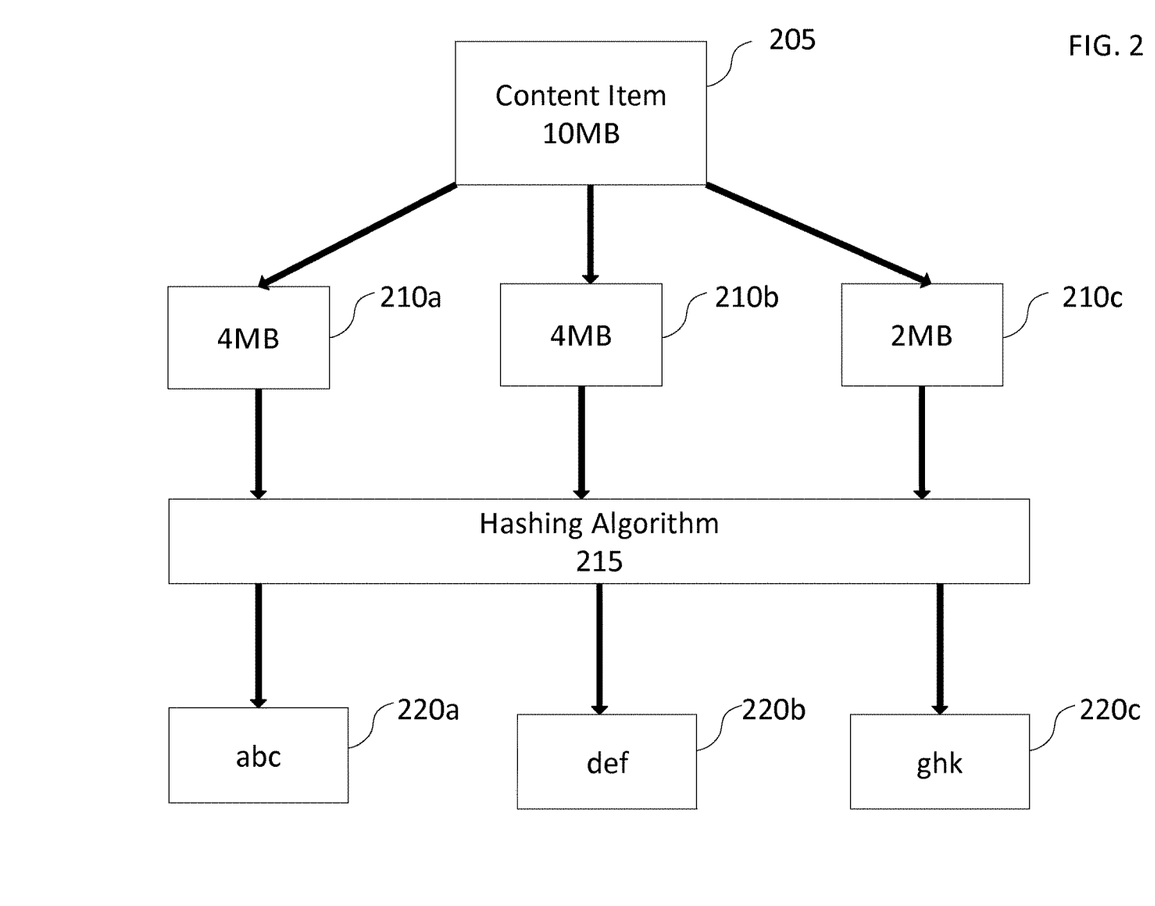
FIG. 2 shows an exemplary embodiment of a content item being split into fixed size blocks and hashed to create a block list.

FIG. 2 shows an exemplary embodiment of content item 205 being split into fixed size blocks 210a, 210b, 210c and hashed to create a block list. As shown 10 MB content item 205 is split into three fixed size blocks 210a, 210b, 210c. As shown fixed size blocks 210a, 210b are 4 MB and fixed size block 210c is 2 MB. Each of fixed size blocks 210a, 210b, 210c are used as keys to hash algorithm 215 to result in three unique hash identifiers 220a, 220b, 220c.

Each of resulting hash identifiers 220a, 220b, 220c are a three character string. Hash identifier 220a is the string 'abc,' hash identifier 220b is 'def' and hash identifier 220c is 'ghk.' Hash identifiers 220a, 220b, 220c can be used to create a block list to uniquely identify content item 205. For example, hash identifiers 220a, 220b, 220c can be concatenated to create a block list such as 'abcdefghk,' which can be used to uniquely identify content item 205. Further, the block list can be used to determine whether a content preview has already been created for content item 205.

Figure 3:
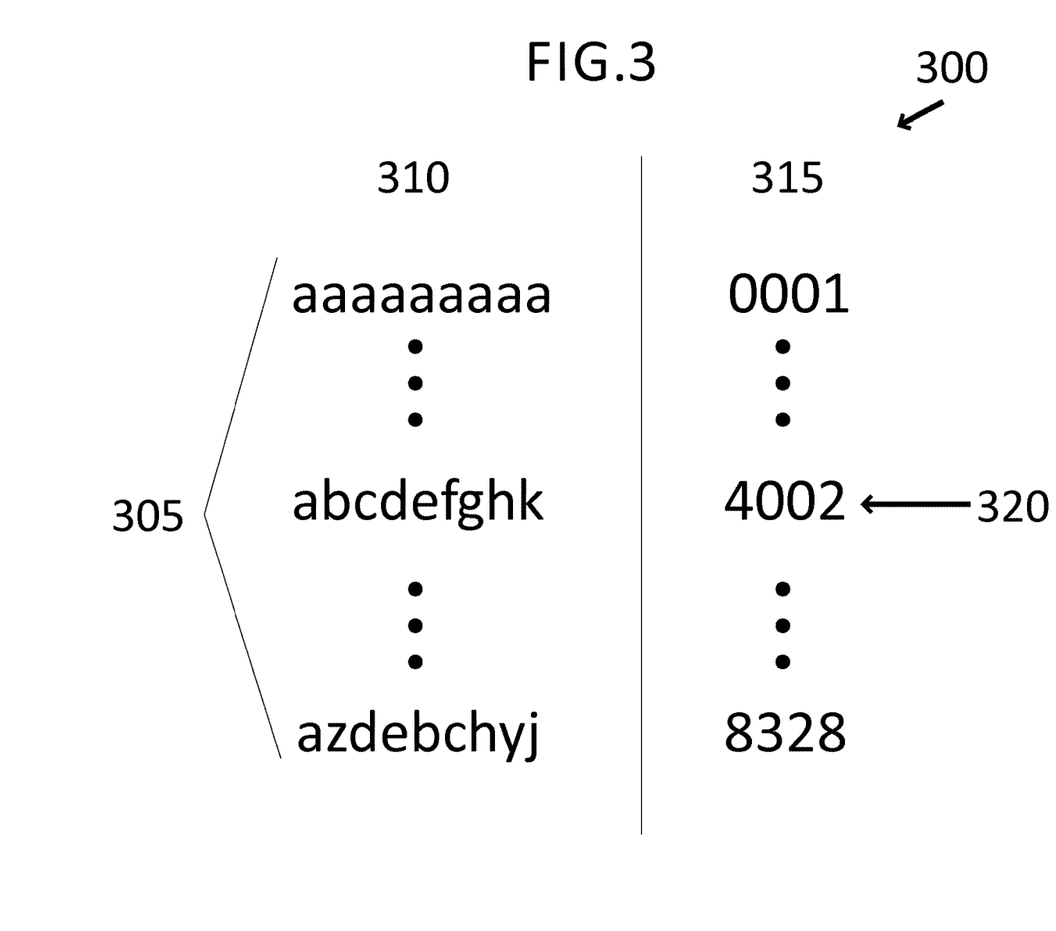
FIG. 3 shows an exemplary preview index.

FIG. 3 shows an exemplary preview index 300, which is discussed in view of FIG. 2. As shown, preview index 300 includes multiple preview entries 305. Each preview entry 305 includes a block list 310 and a location 315 of the content preview in memory. As shown, preview entry 320 has a block list value 'abcdefghk' indicating that a content preview associated with content item 205 exists. Further, preview entry 320 indicates that the content preview of content item 205 is located at memory location 4002.

Figure 4:
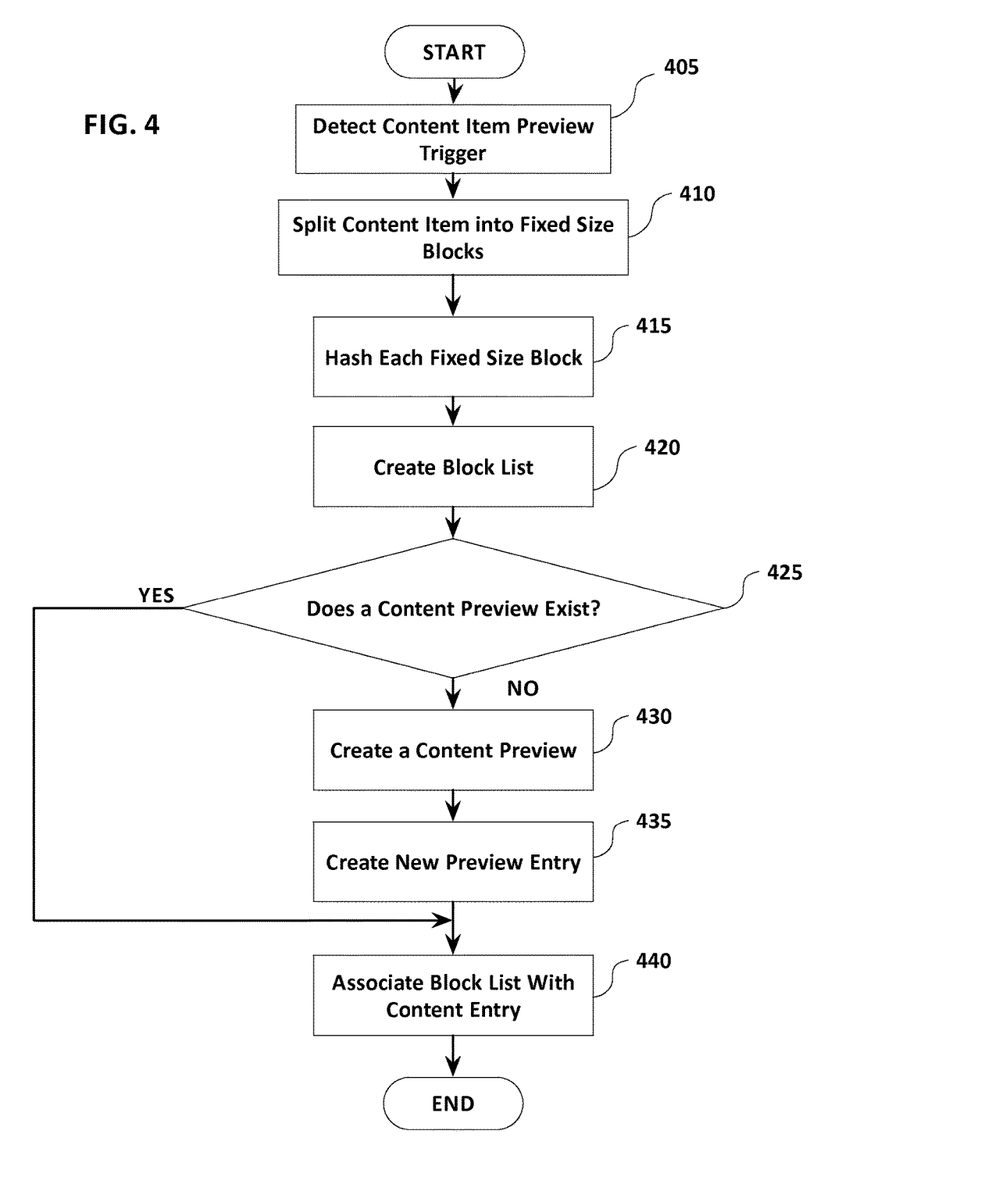
FIG. 4 shows an exemplary method embodiment of creating a content preview.

FIG. 4 shows an exemplary method embodiment of creating a content preview. As shown the method begins at block 405 where a content item preview trigger is detected.

A content item preview trigger can be a content item being added to a content library or the modification of an existing content item in the content library. The method then continues to block 410 where the content item associated with the content item preview trigger is split into fixed size blocks. For example, the content item that was added or modified can be split into fixed size blocks.

The method continues to block 415 where each fixed size block is used as a hash key in a hashing algorithm. In some embodiments, the entire fixed size block can be used as the hash key. In some embodiments, just a portion of the fixed size block can be used as the hash key.

The method continues to block 420 where a block list is created from the resulting hash identifiers returned as a result of using the fixed size blocks as hash keys. The block list can be created in any number of ways. For example, in some embodiments, the block list can be created by concatenating the resulting hash identifiers. In some embodiments, the block list can be created by using the concatenation of the resulting hash identifiers as a hash key in a second hashing function.

At block 425 the method determines whether the block list is associated with a preview entry in the preview index. If at block 425 it is determined that there is a preview entry associated with the block list, a content preview associated with the content item already exists and the method continues to block 440 where the block list is stored in the content entry associated with the content item.

If at block 425 it is determined that a preview entry associated with the block identifier does not exist in the preview index, then a content preview for the content item does not already exist and the method continues to block 430 where a content preview for the content item is created and stored in memory. The method then continues to block 435 where a new preview entry is created in the preview index. The new preview entry can include the block list and the physical location of the content preview in memory. Finally, the method continues to block 440 where the block list is stored in the content entry associated with the content item.

Figure 5:
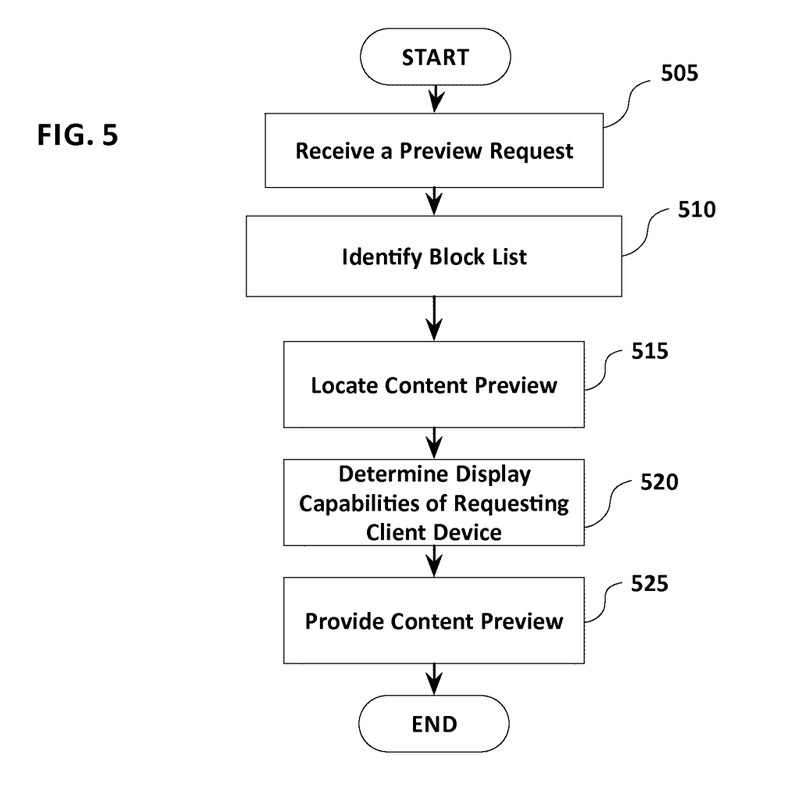
FIG. 5 shows an exemplary method embodiment of providing a content preview to a client device.

FIG. 5 shows an exemplary method embodiment of providing a content preview to a client device. As shown, the method begins at block 505 where a preview request is received from a client device. A preview request can be a request to view a preview of a content item stored in a content library associated with the client device. In some embodiments, a user interface element such as a button or selectable link configured to create a preview request can be provided to the client device. The user interface element can identify a specific content item to preview.

Upon selection of the user interface element, a preview request identifying the content item can be created and sent to the content management system. Upon receiving the preview request, the method continues to block 510 where the block list associated with the content item is identified. In some embodiments, the preview request can include the block identifier. In some embodiments, the preview request can include preview request data that can be used to identify the content entry associated with the content item. For example, the preview request data can include the user account identifier and content path associated with the content item. This data can be used to identify the content entry associated with the content item and thus the block list.

Upon identifying the block list associated with the content item, the method continues to block 515 where the requested content preview is located. The block list can be used to search the preview index for the corresponding preview entry that identifies the location of the content preview in memory.

After the content preview is located, the method continues to block 520 where the display capabilities of the client device are determined. For example, in some embodiments, profile data associated with the client device can be checked to determine the display capabilities of the client device. In some embodiments, a display capability request that requests that information indicating the display capabilities of the client device can be sent to the requesting client device. In some embodiments, the display capabilities of the client device can be included in the preview request received from the client device.

Upon determining the display capabilities of the client device, the method continues to block 525 where the content preview is displayed on the client device in a format capable of being displayed on the client device.

Figure 6A:
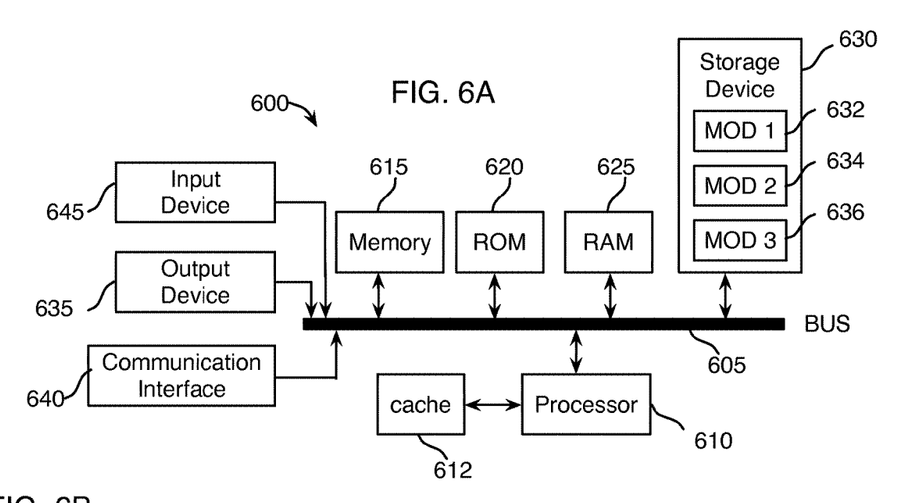
FIGS. 6A and 6B show exemplary possible system embodiments.
Figure 6B:
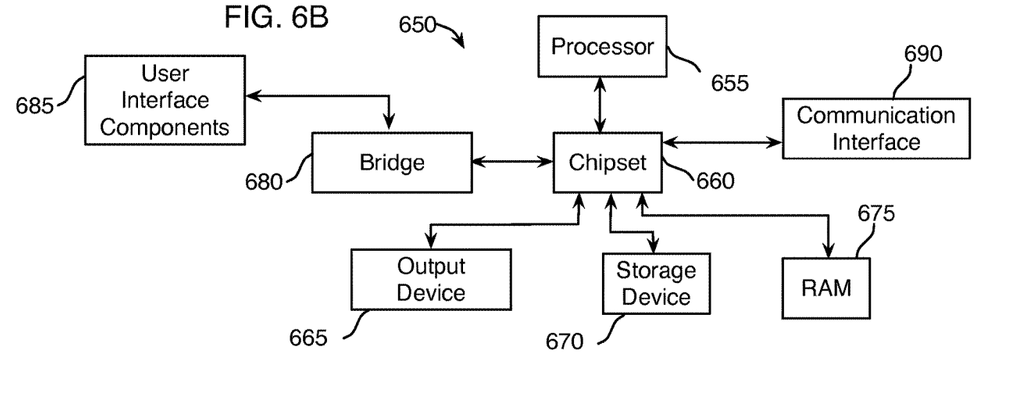

FIG. 6A and FIG. 6B show exemplary possible system embodiments. The more appropriate embodiment will be apparent to those of ordinary skill in the art when practicing the present technology. Persons of ordinary skill in the art will also readily appreciate that other system embodiments are possible.

FIG. 6A shows a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B shows a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
receiving, via one or more processors, a request to store a content item, the content item being split into at least a first block containing a first portion of the content item and a second block containing a second portion of the content item, the second portion being different from the first portion, wherein the request to store the content item is associated with a first user account;
computing, via the one or more processors, a first hash identifier by hashing at least part of the first block containing the first portion;
computing, via the one or more processors, a second hash identifier by hashing at least part of the second block containing the second portion;

generating, via the one or more processors, a hash key comprising the first hash identifier and the second hash identifier;

determining, based on the hash key, whether a content preview of the content item is available; and when the content preview is available, identifying the content preview for the content item based on the hash key, wherein the content preview is associated with a second content item in a second user account.

2. The method of claim 1, wherein the first block and the second block are split into fixed size blocks.

3. The method of claim 1, further comprising:

assigning the content preview to the content item in the first user account.

4. The method of claim 1, wherein generating the hash key comprises concatenating the first hash identifier and the second hash identifier, and wherein identifying the content preview for the content item comprises:

searching a preview index for an existing preview entry associated with the hash key, the preview index comprising a plurality of preview entries, wherein each preview entry in the plurality of preview entries comprises a respective hash key and a storage location of an assigned content preview.

5. The method of claim 4, wherein generating the hash key comprises generating a block list containing the hash key, wherein determining whether the content preview is available and identifying the content preview is based on the block list, wherein the existing preview entry is associated with the block list, and wherein each preview entry comprises a respective block list associated with the respective hash key.

6. The method of claim 1, wherein identifying the content preview comprises identifying a location of the content preview, the method further comprising:

receiving, from a client device, a preview request associated with the content item; and providing, to the client device, the content preview.

7. The method of claim 6, wherein the preview request identifies the hash key, and wherein the location of the content preview is identified by searching a preview index based on the hash key.

8. The method of claim 6, wherein the preview request includes data identifying a content entry associated with the content item, the content entry identifying the hash key, and wherein the location of the content preview is identified by searching a preview index based on the hash key.

9. A system comprising:

one or more processors; and at least one non-transitory computer-readable storage medium containing instructions which, when executed by the one or more processors, cause the system to:

receive a request to store a first content item in a first user account, the first content item being split into at least a first fixed size block and a second fixed size block, wherein each of the first fixed size block and the second fixed size block contains a unique portion of the first content item;

compute a first hash identifier using at least a part of the unique portion of the first fixed size block as a first hash key in a hashing algorithm and a second hash identifier using at least a part of the unique portion of the second fixed size block as a second hash key in the hashing algorithm;

generate a block list containing a general hash key created by concatenating the at least the first hash identifier and the second hash identifier;

identify the content preview for the first content item based on the generated block list, wherein the content preview is associated with a second content item in a second user account; and assign the content preview to the first content item in the first user account.

10. The system of claim 9, wherein identifying the content preview for the first content item comprises:

searching a preview index for an existing preview entry associated with the block list, the preview index comprising a plurality of preview entries, wherein each preview entry in the plurality of preview entries comprises a block list and a location of an assigned content preview.

11. The system of claim 9, the at least one non-transitory computer-readable storage medium containing additional instructions which, when executed by the one or more processors, cause the system to:

receive, from a client device, a preview request associated with the first content item;

identify the location of the content preview; and return, to the client device, the content preview.

12. The system of claim 11, wherein the preview request includes the block list, and wherein the location of the content preview is identified by searching a preview index based on the block list.

13. The system of claim 11, wherein the preview request includes data identifying a content entry for the first content item, the content entry identifying the block list, and wherein the location of the content preview is identified by searching a preview index based on the block list.

14. At least one non-transitory computer-readable storage medium comprising:

instructions stored on the at least one non-transitory computer-readable storage medium which, when executed by one or more processors, cause the one or more processors to:

receive a request to store a content item, the content item being split into at least a first block containing a first portion of the content item and a second block containing a second portion of the content item, the second portion being different from the first portion, wherein the content item is associated with a first user account;

compute a first hash identifier by using at least part of the first block containing the first portion as a first hash key in a hashing algorithm;

compute a second hash identifier by using at least part of the second block containing the second portion as a second hash key in the hashing algorithm;

generate a block list containing a third hash key created based on the first hash identifier and the second hash identifier;

identify, based on the block list, a content preview available for the content item wherein the content preview is associated with a second content item in a second user account; and assign the content preview to the content item.

15. The at least one non-transitory computer-readable storage medium of claim 14, wherein the first block and the second block are split into fixed size blocks.

16. The at least one non-transitory computer-readable storage medium of claim 15, storing additional instructions which, when executed by the one or more processors, cause the one or more processors to:

split the content item into one or more third fixed size blocks; and generate one or more respective hash identifiers by hashing at least part of the one or more respective fixed size blocks;

wherein the third hash key is further based on the one or more respective hash identifiers.

17. The at least one non-transitory computer-readable storage medium of claim 14, storing additional instructions which, when executed by the one or more processors, cause the one or more processors to:

create the third hash key by concatenating the first hash identifier and the second hash identifier.

18. The at least one non-transitory computer-readable storage medium of claim 14, wherein identifying the content preview comprises identifying a location of the content preview, the non-transitory computer-readable storage medium storing additional instructions which, when executed by the one or more processors, cause the one or more processors to:

receive, from a client device, a preview request associated with the content item; and provide, to the client device, the content preview.

19. The at least one non-transitory computer-readable storage medium of claim 18, wherein the preview request identifies at least one of the block list or the third hash key, and wherein the location of the content preview is identified by searching a preview index based on the hash key.

20. The at least one non-transitory computer-readable storage medium of claim 18, wherein the preview request includes data identifying a content entry associated with the content item, the content entry identifying at least one of the block list or the third hash key, and wherein the location of the content preview is identified by searching a preview index based on at least one of the block list or the third hash key.

* * * * *